United States Patent [19]
Traxler et al.

[11] Patent Number: 4,916,599
[45] Date of Patent: Apr. 10, 1990

[54] SWITCHING POWER SUPPLY

[75] Inventors: John C. Traxler; Richard C. Whitham, II, both of Sarasota, Fla.

[73] Assignee: HyperPower, Inc., Sarasota, Fla.

[21] Appl. No.: 329,956

[22] Filed: Mar. 29, 1989

[51] Int. Cl.[4] ............................................ H02M 3/335
[52] U.S. Cl. ......................................... 363/65; 363/71; 363/98; 219/121.54; 219/130.1; 219/130.33
[58] Field of Search ........................ 363/17, 65, 67, 71, 363/95, 97, 98, 132; 323/289; 219/121.54, 121.57, 130.1, 130.21, 130.31, 130.32, 130.33

[56] References Cited

U.S. PATENT DOCUMENTS

| | | | |
|---|---|---|---|
| 3,390,320 | 6/1968 | Kammiller et al. | 363/71 |
| 3,781,508 | 12/1973 | Dauer et al. | 219/121.57 |
| 4,503,316 | 3/1985 | Murase et al. | 219/130.33 |
| 4,564,742 | 1/1986 | Karlsson | 363/71 |
| 4,695,933 | 9/1987 | Nguyen et al. | 363/71 |
| 4,758,941 | 7/1988 | Felton et al. | 363/98 |

OTHER PUBLICATIONS

Pippenger, D. E. et al., *Linear and Interface Circuits Applications*, vol. 1 (Texas Instruments, 1985), pp. 6-1 to 6-13.

*Primary Examiner*—Peter S. Wong
*Attorney, Agent, or Firm*—Wolf, Greenfield & Sacks

[57] ABSTRACT

A pulse-width-modulated, switching power supply has a pulse width modulator, a full bridge network driving a pulse transformer, power switching section, a high frequency power transformer, an output rectifier and an output inductor. The power switching section includes two or more H-bridge networks each preferably having four FET's. The pulse transformer, controlled by the pulse width modulator, in turn controls the switching of the H-bridge networks. This switching is simultaneous in each H-bridge network, preferably to within 50 nanoseconds. The pulse transformer windings are coaxial and short. The outputs from the H-bridge networks are applied to in-phase windings of the power transformer. The power windings are segmented and wound on cores in side-by-side relationship to produce a "finite" mutual inductance among the primaries of the power transformer. This finite inductive coupling allows variations in the H-bridge power outputs of up to one dB.

14 Claims, 5 Drawing Sheets

SWITCHING POWER SUPPLY

FIELD OF THE INVENTION

The present invention relates to switching power supplies and more particularly to power supplies for plasma arc cutting equipment.

BACKGROUND OF THE INVENTION

A plasma is a gas which is sufficiently ionized to conduct current freely. Plasma arc cutting refers to a process which employs a high temperature arc or plasma jet to achieve melting and vaporization of a conductive material such as steel plate. The process is carried out by transferring a constricted electric arc from a negatively charged electrode through an ionized high velocity gas to a positive charged conductive workpiece. Plasma arc cutting equipment refers to equipment used to cut electrically conductive material.

Plasma cutting equipment generally comprises two main subassemblies, a power supply, which converts AC power to DC power, and a torch. The power supply, which typically represents 80% of the size, weight, and cost of the equipment, has the greatest need for improvement in size, weight, cost, and reliability In a switching power supply, the AC input is rectified and filtered, chopped by a high frequency transistor switch/transformer combination, and then rectified and filtered again. The operation of the transistor switch can be controlled by a pulse width modulator (PWM) circuit including a ramp oscillator driving a differential voltage comparator, an error amplifier and a voltage reference. The error amplifier compares the reference with a sample of the supply's output voltage or current. As the load increases, the output drops; this drop is sensed in the error amplifier which causes the PWM, and consequenly the transistor switch, to remain ON for a longer time period. As a result, more energy is transferred to the transformer and the output of the supply increases. An overview of power supplies of this type appears in Section 6 "Switching Power Supply Design" of Vol. 1 of *Linear and Interface Circuit Applications* by D. E. Pippenger and E. J. Tobaben (Texas Instruments, 1985).

A switching supply does not need the relatively heavy and expensive power line transformer required by a linear power supply, the other type of power supply in common use. Besides the advantages of lighter weight, smaller size and lower cost, a switching supply is more electrically efficient since the transistor switch is either completely ON or OFF and the switch is operated at a frequency much higher than the AC line frequency. Switching supplies also generate more electromagnetic interference than linear supplies but this effect can be significantly reduced by, for example, filtering the input and output of the supply. Another problem that can occur due to the extremely high frequency components of a fast rising signal is "ringing", that is, the trapping and circulation of electrical energy in LC circuits created by the inherent inductance of conductors and the equivalent circuit gate to source capacitance of the power-switching transistors. If a transformer is connected to the switches, ringing can also be produced due to the parasite capacitance inherent in the transformer windings. Circulating electrical energy in such LC circuits is a problem since it introduces an uncertainty in the timing of the switching of the transistors.

In current designs, the power available from a switching supply is limited by the current and power capacity of the transistor switches used in the power output stage of the power supply. For example, field effect transistor (FET) H-bridges are commonly used in the power switching stages of switching power supplies. Although high power FET's are available, these transistors cannot provide unlimited power. Typically, on the order of 1 kilowatt can be provided by a single H-bridge using high power FETs. Where higher powers are required, H-bridge switches are typically connected in parallel. This arrangement has some disadvantages, however. In order to equalize the power flowing through the parallel H-bridge switches, the transistors used in the bridge are carefully matched, and additional circuitry may also be required to balance the power flowing through the individual switches. It would be advantageous to have a method of increasing the power available from a switching power supply by paralleling power output stages without the necessity (and cost) of using matched transistors or additional circuitry to ensure equal division of the output power between the parallel power stages. It would also be advantageous to have such a power supply which operates well with a plasma arc cutting torch as the load. A plasma arc torch is a difficult load because the load can vary greatly, the arc generates a high level of electromagnetic interference, and the plasma can be snuffed out by transient fluctuations in the power feeding the plasma.

Finally, it should be noted that pulse transformers with coaxial winding are known, but heretofore they have been used typically for VHF signal transmissions where the transformer changes the impedance between two very different levels. Also, more generally, transformers have been used as transistor gate drives. One example is a fast switch for a grid pulse modulator of a traveling wave tube amplifier. This application, which was used for electronic warfare countermeasures, involved a transformer with multiple secondaries that each drove one of a set of series-connected 2N 2222 bipolar transistors. To the best of applicants knowledge, however, a pulse transformer acting under the control of a pulse width modulator has never been used to control the synchronous switching of multiple H-bridges connected in parallel and each feeding a separate primary of a common power transformer as a way of paralleling the H bridges while still maintaining a synchronization of their switching.

It is therefore a principal object of the present invention to provide a regulated power supply that simultaneously couples a control signal to multiple switching circuits, not merely to multiple discrete switches, to provide higher output power levels than have been attainable heretofore from single bridge power supplies of this type.

Another principal object is to provide a power supply with the foregoing advantages that is comparatively inexpensive to manufacture and can use inexpensive, non matched MOSFET transistors in its switching circuits.

Yet another object is to provide a power supply with the foregoing advantages which operates reliably and with good efficiency.

A further object is to provide a power supply with the foregoing advantages that operates well with a plasma arc torch as a load, exhibits good maintenance characteristics, and has good adjustability.

Still another object is to provide a power supply with the foregoing advantages that is modular for convenient expansion or contraction of the maximum power rating of the supply, and does not require expensive, or performance restrictive, circuitry to balance the power flow through the modules.

A yet further object of the invention is to provide a switching power supply with the foregoing advantages that is compact, lightweight, and has good heat generation and dissipation characteristics.

SUMMARY OF THE INVENTION

In brief, a power supply in accordance with the present invention is a pulse width-modulated, switching power supply including a pulse width modulator, a full bridge network driving a pulse transformer, power switching section, a power transformer, an output rectifier and an output inductor. The power switching section includes two or more H-bridge networks according to the desired output level of the supply each having four FET's that do not have to be carefully matched. The pulse transformer, controlled by the pulse width modulator, in turn controls the switching of the H-bridge networks. This switching is simultaneous in each H-bridge network, preferably to within 50 nanoseconds. To limit timing uncertainty and provide sufficient bandwidth, the pulse transformer windings are coaxial to reduce the mutual inductance of the windings. The windings are short to reduce the parasitic capacitance and thus provide good bandwidth. The pulse transformer also utilizes a core that provides a good magnetic flux path, preferable a toroid or U-shaped core of a ferrite with a large diameter cross-section, typically 3–10 cm$^2$ and a short path length, typically 10–20 cm. The outputs from the H-bridge networks are applied to in-phase windings of a high frequency power transformer. The power windings are segmented and also wound on toroidal or U-shaped cores in side-by side relationship to produce a finite mutual inductance among the primaries of the power transformer. This inductive coupling is sufficient to allow variations in the H bridge power outputs of up to one dB, and in combination with the close coupling of the pulse transformer gate drive allows the H-bridge to operate in synchronization despite some mismatch in the switching and performance of the power FET's. The output of the transformer is rectified by fast-recovery bridge rectifier including an R-C snubber network. The output of the rectifier is then filtered by the output inductor series-connected connected in series. By means of this circuitry, a plurality of H-bridge networks may be connected in parallel to provide high output powers, more reliably, efficiently and economically and in a more physically compact configuration than can be provided by H-bridge circuits of conventional design.

BRIEF DESCRIPTION OF THE DRAWINGS

Other features and advantages of the present invention will become apparent from a reading of the following detailed description of an exemplary embodiment in conjunction with the accompanying drawings in which.

DETAILED DESCRIPTION

The present invention relates to a pulse width modulated switching power supply with a continuously adjustable constant current output. In the described embodiment, the output is regulated by an integrated circuit pulse width modulator which is responsive to a current feedback network. The output current can be varied between two preset limits determined by a resistor divider network. The amount of output current selected between the above preset limits is user adjustable by a potentiometer. A typical power output for a plasma arc torch is 200 V DC at 30 amperes, a power level which can be achieved with prior art power supplies using matched transistors or power balancing circuitry, but with severe penalties in cost, size, efficiency, and compactness. In particular, the power rating of the present invention per unit of volume of the size of the power supply is roughly twice that of known power supplies of comparable ratings. A typical ratio for this invention is in excess of 8 watts/in$^3$.

Figure 1:
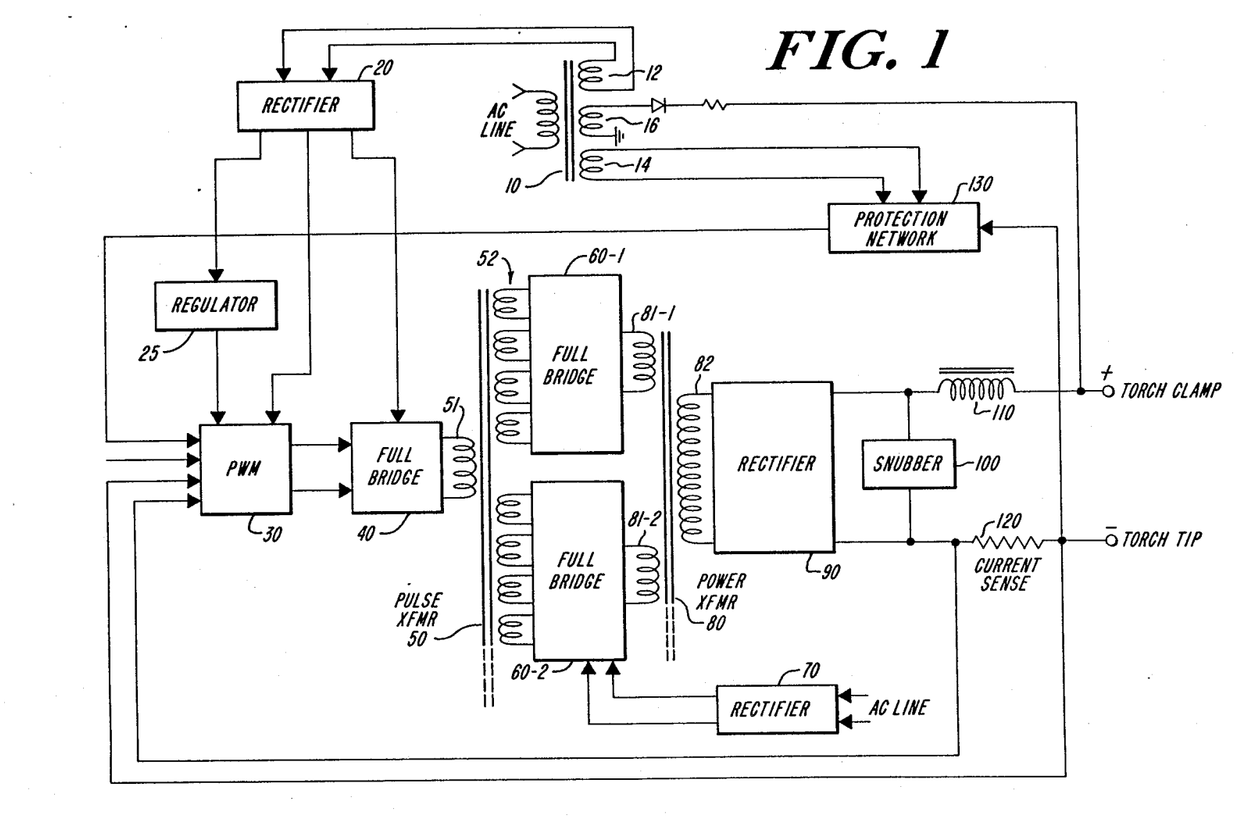
FIG. 1 is a block diagram of one embodiment of a power supply in accordance with the present invention.

Referring to FIG. 1, there is shown an embodiment of the present invention suitable for powering a plasma cutting torch. A small transformer 10 having three secondary windings 12, 14, and 16 provides low-level AC voltages suitable for powering the control circuitry of the switching power supply. As described in more detail below, the transformer 10 does not provide the main power to the cutting torch, therefore it need not be especially large or heavy. A first secondary winding 12 supplies a rectifier circuit 20 which converts the low-level AC voltage to a DC voltage that is applied to a pulse width modulator 30 and to a group of four transistors arranged as a full bridge, or H-bridge, 40. The DC output of rectifier 20 is also applied to the pulse width modulator 30 through a voltage regulator 25. Pulse width modulator 30 provides control signals to the full bridge 40 in response to output feedback and protection signals and an operator input signal described in more detail below.

The transistors of the full bridge circuit 40 drive a pulse transfomer 50 which in turn drives parallel H-bridges. The pulse transformer has a single primary winding 51 and a plurality of secondary windings 52. In one form, the pulse transformer 50 uses a toroidal ferrite core of large cross-sectional area wound with a plurality of segments of coaxial cable. A typical 1 KW core with a circular cross section has an outside diameter of approximately 2.5 inches and a magnetic path length $L_e$ of about 15 cm. Path lengths of 10–20 cm are typically for the power levels suitable for use in powering a plasma arc cutting torch. The cross-sectional area of the magnetic path, $A_e$, is preferably about 4–6 cm$^2$, but typically can range from 3–10 cm$^2$ for plasma power supply applications. The segments of coaxial cable are configured so that the primary winding comprises a combination of either the shields or center conductors of all the segments connected to one another in parallel and the secondaries comprise the other conductors of the segments which float electrically with respect to each other and with respect to ground. The large cross-sectional area, $A_e$, minimizes the number of turns in the windings, providing the highest possible parallel inductance with the lowest possible mutual inductance. The core material is characterized by a good high frequency response (1 Mhz to GHz) and a large bandwidth (10–100 MHz). A preferred material is a ferrite such as the manganese zinc material sold under the trade designation Ferroxcube 3C8.

The output signals from the secondary windings of the pulse transformer 50 drive a plurality of H-bridges 60-1, 60-2, etc. substantially simultaneously, so that the operation of each H-bridge switching network is synchronous with all of the other H-bridge switching networks and with the pulse width modulated control signal. As will be discussed in greater detail below, with the aforementioned core material, core configuration, and core dimensions, and with short coaxial windings designed to reduce mutual inductance and parasitic capacitance in the windings, the pulse transformer 50 is characterized by a low uncertainty time in its switching. Stated in other words, the LC circuits established when the pulse transformer secondaries are connected to drive the gates of the field effect transistors (FET's) in the H-bridges, the inductance L and capacitance C is such that there is little circulating electrical energy or "ringing" which can adversely affect a synchronous switching of the H-bridges. For the output power levels and four H-bridge design described herein with reference to the preferred embodiments, the L and C values are selected so that the resonant frequency $f_n$ is about 2 MHz. Typical values for L are 100 pf and for H are 10 to 100 $\mu$h, where $1/(2f_n)^2 = LC$.

The number of H-bridges is selectable depending on the amount of output power desired from the supply. Thus the power supply of the present invention is modular and can be tailored to meet preselected operating characteristics such as maximum power output. Rectified power to the H-bridges 60 is supplied directly from the AC line through a suitable diode bridge 70.

Each H bridge 60 has an individual primary winding 81 on a power transformer 80. All of these primaries are wound in phase on a common power transformer core, or on a multiplicity of cores. The pulse width modulator circuit 30 thus controls the switching of all H-bridge sections 60 via the one pulse transformer 50, achieving matched switching characteristics for each H-bridge section. Switching time is usually extremely fast, on the order of 50 nanoseconds.

Just as the characteristics of the pulse transformer are critical to its proper function as a gate drive for multiple H-bridges, similarly the design of the power transformer is also important to achieving a workable power supply design. In particular, the primaries 81 of the power transformer 80 are wound so that the primaries are not closely coupled one to the other, while primary to secondary coupling inductance is minimized through the use of ferrite cores and copper coils of a configuration described in more detail below. Primary-secondary sets are segmented, that is, wound side-by-side on the core, not overlying one another. Because the secondaries of each set of the power transformer are hard wired to one another, the primaries are inductively coupled to one another principally through the secondaries. The result is a finite mutual inductance between the power transformer primaries which tolerates mismatches in the outputs of the H-bridge FET's of about 1 dB.

The output from the secondary 82 of the power transformer 80 is applied to a fast-recovery bridge rectifier 90. The fast-recovery diodes in the bridge rectifier 90 are protected from voltage switching transients by a snubber network 100. The rectified power is then fed through a single pole filter comprised of a series output inductor 110 of medium value, as described in greater detail below. The output inductor core material is chosen to be very lossy in the range of the power supply switching frequency. This passive device provides an intrinsic damping characteristic which is desirable in many applications, where the plasma is ideally fed by a very smooth, steady and reliable power supply so that the plasma does not suddenly snuff out.

The snubber network 100 also acts to detune a resonant circuit formed by the output inductor 110 and the snap switching action of the fast-recovery diodes in the bridge rectifier 90, and winding capacitances.

A feedback signal representative of the current output of the supply is provided by the voltage drop across a small-value series resistor 120 in the return line from the torch or other load. The output voltage signal is also provided to a protection network 130 of conventional design. The protection network 130 produces control signals which are used in the control of the pulse width modulator 30, as described below.

Figure 2:
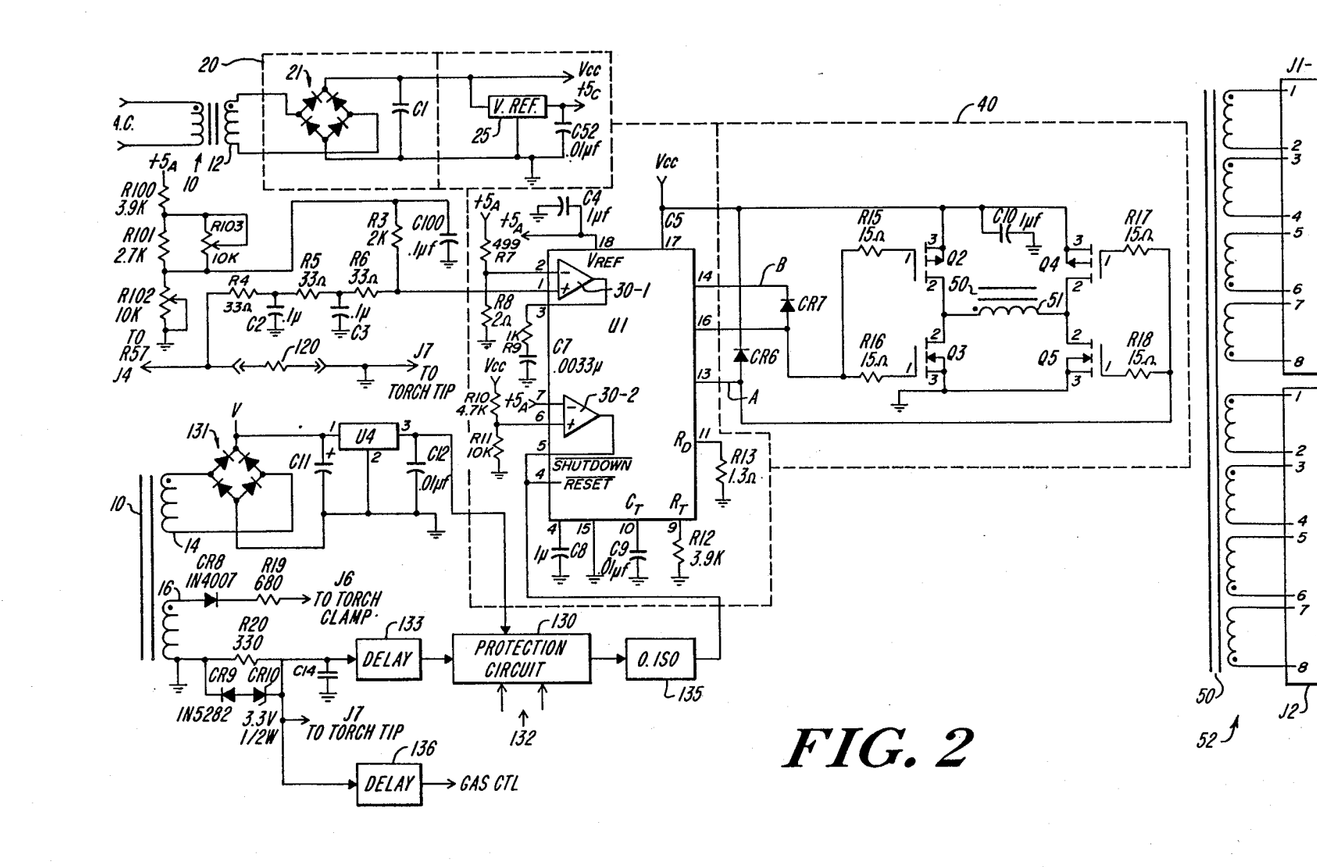
FIG. 2 is an electrical schematic diagram of a portion of the block diagram of FIG. 1.

Referring now to FIG. 2 which is an electrical schematic diagram of a portion of the block diagram of FIG 1, at the upper left is shown the transformer 10 with the first secondary winding 12. Power from the AC lines is applied to the primary of transformer 10. First secondary winding 12 reduces the input line voltage to a suitable level, e.g. 12.8 VAC, which is applied to the rectifier 20. The rectifier 20 converts the AC voltage output from the first secondary 12 to a corresponding DC voltage $V_{cc}$, e.g. 18 VDC, and includes a diode full bridge 21 and filter capacitor C1 as shown. The DC voltage $V_{cc}$ is applied to other components of the power supply, as described in more detail below, and to the regulator 25. Regulator 25 converts the voltage $V_{cc}$ to a lower level DC voltage $+5_c$ and can be implemented by means of a Motorola 78L05 integrated circuit 26, with a suitable filter capacitor C52.

The DC voltage $V_{cc}$ from the rectifier 20 is applied to the pulse width modulator (PWM) 30. In the described embodiment, the PWM 30 includes a regulating PWM integrated circuit U1 such as the model SG13526 manufactured by Silicon General of Garden Grove, Calif.

PWM circuit provides a regulated voltage output designated as $+5_A$ which serves as a reference voltage for an error amplifier 30-1 included in the PWM. The level of output $+5_A$ is divided by the resistive network R7-R8 to a suitable level and applied to the negative input of the error amplifier. The positive input to the error amp is derived from a summation of the voltage across the output current sense resistor 120 and a voltage derived from an operator adjustable potentiometer-resistor network R100-R103. R-C networks R3-C100 and R4-R5-R6-C2-C3 filter the voltage summed to avoid electrical noise problems. The value of resistor 120 is on the order of 1 to 2 milliohms. Of course, the precise design of this and other portions of the circuit can be modified depending on the load or other design criteria.

The sawtooth oscillator in PWM 30 is programmed for a specific frequency, e.g. 40 KHz, and deadband by the components C9, R12 and R13. The ramp waveform output of the osciallator is internally connected to one side of the internal PWM comparator. The other side of the comparator is connected to the output of the error amplifier which also has associated with it on-chip soft start circuitry including a comparator 30-2. One input to the comparator 30-2 is the voltage reference $+5_A$ and the input is a fraction of the DC output $V_{cc}$ of the rectifier 20 forming a generic low line lockout circuitry. If the second input should fall below the voltage necessary for normal operation of the control circuitry, e.g. 10 volts, the shutdown and reset terminals are held at logic LOW, by the output from gate 135 inhibiting the output from the PWM 30. These terminals are also connected to the protection network 130, as described in more detail below.

The internal sawtooth oscillator is controlled by the timing capacitor C9 which is charged by a constant current programmed through resistor R12. After the capacitor has charged linearly to a nominal level, it is rapidly discharged and then allowed to recharge. The ratio of charge time to discharge time or dead time is nominally 29:1 although it can be changed by the resistance R13.

Two output signals, A and B, generated by the PWM IC are thus fixed-frequency, pulse-type signals which are switched between ground and $V_{cc}$. The oscillator output (e.g., 40 kHz) is divided by two to form the base carrier frequency of 20 KHz. The two signals A and B are mutually displaced in time by one of the sawtooth oscillator's period. The time duration the signals spent at the $V_{cc}$ level is variable depending on the output signal level from the error amplifier 30-1.

The signals A and B from the PWM 30 drive the gates of four-field-effect transistors Q2–Q5 arranged in the full bridge, common drain, H-bridge network 40. Since FETs have low requirements for gate current drive, Q2–Q5 can be driven directly by the PWM 30. As shown, Q5 and Q2 are turned on while the A signal output is at $V_{cc}$ and the B signal output is at ground, then Q3 and Q4 are turned on while the B signal output is at $V_{cc}$ and the A signal output is at ground. Suitable transistors for Q3 and Q5 are IRF511, Q2 and Q4 are IRF9523 manufactured by International Rectifier of El Segundo, Calif.

The output of H-bridge network 40 is applied to the primary winding 51 of the pulse transformer 50. The pulse transformer 50 effectively couples the control signals A and B from the PWM 30 to the power bridge networks 60, preserving their short rise and fall times and provides electrical isolation between the output of H-bridge 40 and the inputs to H-bridge circuits 60. The gates of the FET's of all of the H-bridges are driven by the pulse transformer in unison. In addition, the pulse transformer 50 allows the gates of the FETs in the power bridges 60 to be electrically floating. As a result, the power bridges 60 may be implemented using only n-channel high-power FETs which are notably cheaper and more readily available than p-channel high-power FETs. Alternatively, all p-channel FETs may be used, if desired.

In designing transformer 50, it is important to minimize the effects of the mutual inductance and parasitic capacitance of the pulse transformer so that the rise times and fall times of the pulse signals applied to the gates of the transistors in the power bridges 60 are as short as possible, which produces a low timing uncertainty. Also in this regard, the often not insignificant inductances of the conductors in the supply wiring should also be compensated. The minimization of mutual inductance is also important in controlling loss of bandwidth and "ringing", that is, the trapping of electrical energy in LC circuits formed by the inductance of the pulse transformer conductors and (i) the gate-to-source equivalent circuit capacitance of the FET's, and (ii) most importantly, the dynamic Miller capacitance, a positive impedance feedback phenomenon.

Figure 4A:
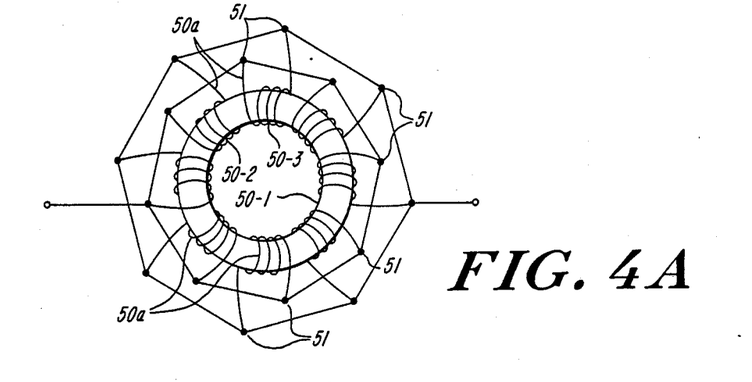
FIG. 4a and 4b are a simplified top plan view of a pulse transformer according to the present invention, having low leakage inductance with FIG. 4a showing the wiring of the segment windings to form the primary and FIG. 4b showing the wiring of the same segment windings to form multiple secondaries.
Figure 4B:
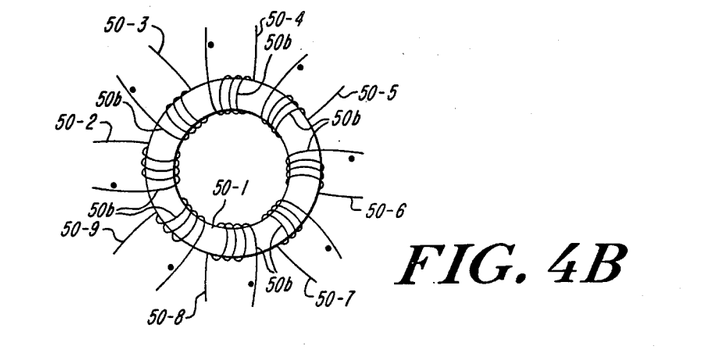
Figure 4C:
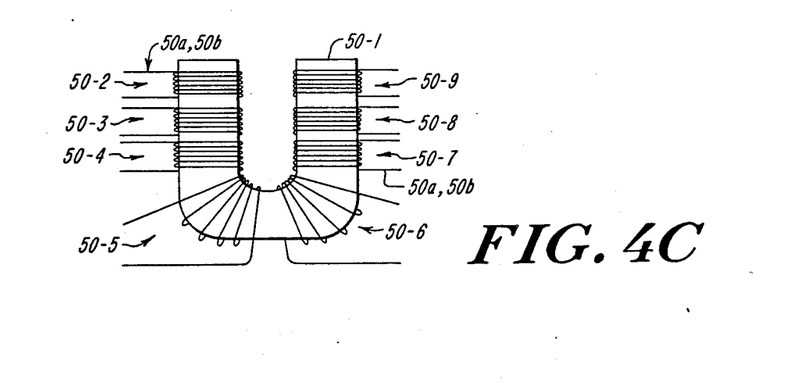
FIG 4c is a simplified top plan view corresponding to FIGS. 4a and 4b of an alternative embodiment of a pulse transformer according to the present invention.

A pulse transformer according to the present invention which provides a minimal amount of mutual inductance is illustrated in FIG. 4. A toroidial ferrite core 50-1 is wrapped with a plurality of segments, 50-2 through 50-9, of coaxial cable. The use of a coaxial cable with multiple conductors is an important feature. The coaxial cable preferably has an insulation with dielectric properties sufficient to withstand primary-secondary voltage differentials of about 4000 volts (assuming a bus voltage of 350 volts). The insulation is also preferably a non-PVC material such as the synthetic resin polymer sold under the trade designation Teflon to facilitate terminations to a wiring board by soldering. The number of cable segments is determined by the number of transistors employed in the power bridges 60, and the maximum number of turns in each segment is determined in a well-known manner by the maximum inductance allowable to achieve a given slew rate in the transmission of the PWM signals to the power bridges 60.

In one form shown in FIGS. 4a and 4b, the core of the transformer 50 is a toroid, preferably having an outside diameter of $2\frac{1}{2}$ inches and an inside diameter of $1\frac{3}{4}$ inches. The core material is preferably a manganese zinc material such as Ferroxcube 3C8. Each winding segment includes three turns of the coaxial cable around the core.

As shown in FIG. 4a to form the primary winding of the pulse transformer 50, respective ends of one of the conductors 50a or 50b of the coaxial cable segments are connected in parallel. For example, the ends of the center or "inner" conductors 50a of the coaxial cable segments can be connected via junctions 51 to produce the primary winding from the multiple coaxial cable segments. FIG. 4b shows secondary windings 50b of the pulse transformer 50 of the same coaxial cable segments depicted in FIG. 4a. If the primary is formed by central conductor, the secondary conductors 50b can be the shields of the coaxial cable segments.

A plurality of groups of the secondary windings on the pulse transfomer 50 are used to drive an equal plurality of power bridge networks 60. Each group comprises four secondary windings in pairs of opposite phase, such as secondary windings 50-2 through 50-5 in FIG. 4b, which are applied to one of the bridges 60. FIG. 2 shows two groups of secondaries having outputs J1-1 through J2-8.

Alternatively, as shown in FIG. 4c, the transformer may be formed using a U-shaped core such as a U-64 core manufactured by Ferroxcube, which is a U shaped core approximately 3 inches by $2\frac{1}{2}$ inches with a 0.9 inch diameter. The U-core has disadvantage in that the air gap increases the transformer reluctance, requiring the transformer to have more turns. A transformer suitable for use with the described embodiment may be implemented by using the above identified U-64 core with six turns per winding segment of coaxial cable on the core. While the FIG. 4a and 4b toroidal core embodiment has fewer windings and offers a somewhat better performance, the U-shaped embodiment of FIG. 4c is less costly to wind and therefore has an advantage in its cost of manufacture.

Figure 3A:
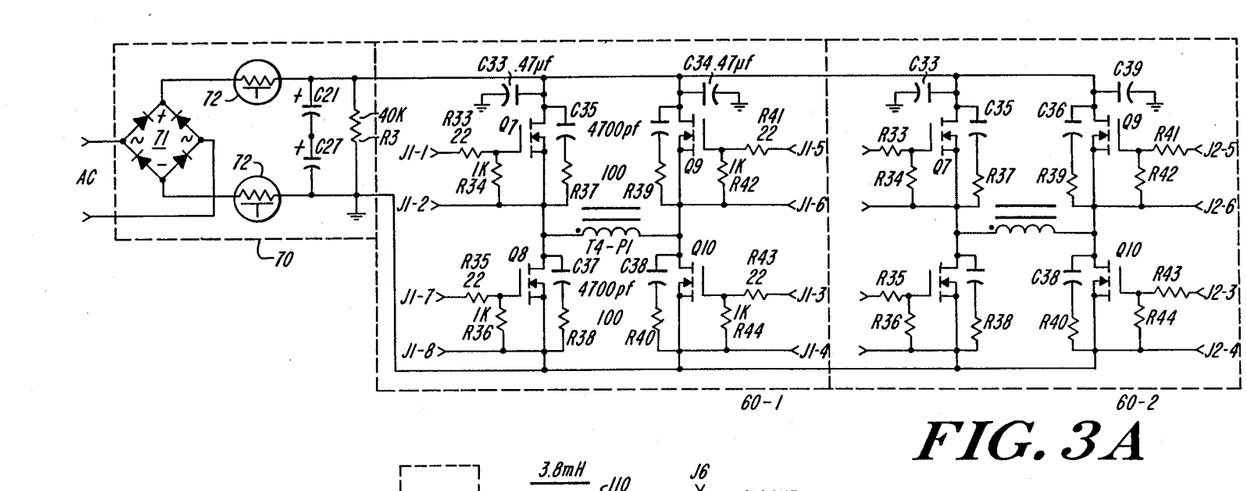
FIG. 3a and 3b are electrical schematic diagrams of other portions of the block diagram of FIG. 1.

Referring now to FIG. 3A, there are shown two power H-bridge networks 60-1 and 60-2. Bridges 60-1 and 60-2 are driven by the outputs J1-1 through J1-8 and J2-1 through J2-8 from transformer 50 shown in FIG. 2. Each bridge network 60 comprises four FETs which drive a corresponding primary winding of power transformer 80. Suitable FETs are International Rectifier model IRF350P. Since the gates of the FETs in the power bridges 60 are effectively floating, the bridges 60 can be implemented by using only n-channel transistors with the proper gate signal polarities being generated by appropriate phasing, as shown in FIG. 2, of the secondary windings of the pulse transformer 50. Thus the present invention provides output powers heretofore unattainable with pulse width modulated switching power supplies while using relatively inexpensive MOSFET transistors that are not matched or coupled through additional power balancing circuitry.

Power for the bridge networks 60 is derived directly from the AC line through the full-wave rectifier circuit 70. The circuit 70 includes a diode full bridge 71, suitable protection fuses 72 and an energy storage network and bleeder including capacitors C21 and C27 and resistor R30.

Figure 3B:
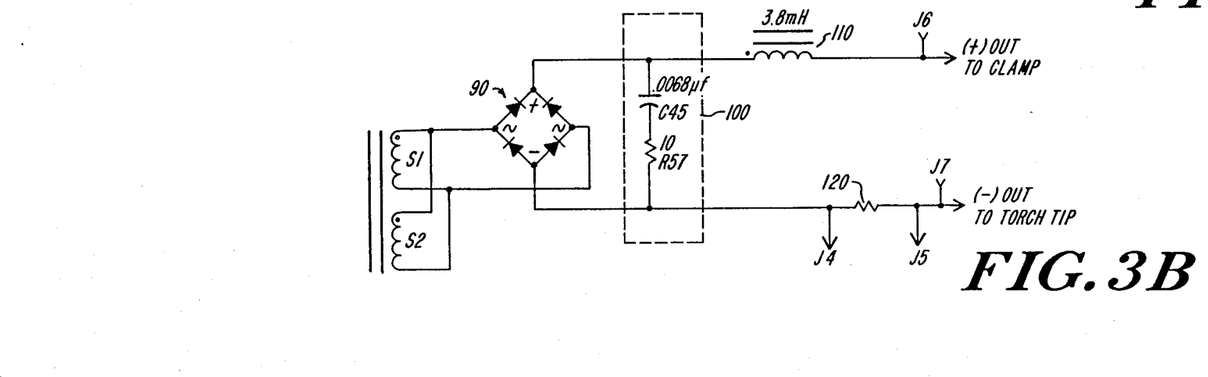

The plurality of primary windings of the power transformer 80 are coupled to an equal plurality of secondary windings, two of which are shown in FIG. 3b. The outputs of the secondaries are rectified by a full bridge 90 of fast-recovery diodes such as the model MPIR 4060 from EDI, Inc. The rectified output of bridge 90 is filtered by the R-C snubber network 100 including capacitors C45 and resistors R57. Six series combinations of a resistor and capacitor are shown connected in parallel in snubber network 100, although any suitable number of series combinations can be employed.

The primaries and associated secondaries of the power transformer are also wound on a toroidal or U shaped core a ferrite material such as Ferrocube 3C8. Each primary secondary set, however, is separated laterally from adjacent such sets to provide a finite mutual inductance that loosely couples the primaries to one another. The degree of coupling can be determined empirically for each application, but the main operative thrust is that the primaries are not tightly coupled, nor are they substantially uncoupled. Rather, there is a balance such that the power transformer can "smooth out" differences in the power output of the H bridges of up to 1 dB. In the preferred form shown, the core is a stack of two toroids each having a 1.75 inch inside diameter, a 2.50 inch outside diameter, and a square cross section that is 0.75 inch on a side.

A medium value series inductor 110 is included in the positive output of the supply which may be connected to a load such as the clamp portion of a plasma cutting torch. A medium value is typically about 4 mh, but can lie in the range of about 100 μh to about 1 H. As noted above, the material of the core of the inductor 110 is selected to be very lossy at the switching frequency of the power supply, e.g. 20 KHz, and upward to 2 MHZ, providing electrical damping which absorbs RF energy and de—"Q"'s resonances and over shoot in the 1 to 5 MHZ band. The resultant constant current is desirable in many applications, such as plasma cutting. Normal silicon transformer steel is suitable.

A small-value series resistance 120 is connected in the power return lead of the supply which is usually connected to the tip of the plasma cutting torch or other load. The voltage drop across the resistance 120 caused by the current flowing through the torch is fed back to the error amplifier 30-1 in the PWM 30 to provide a constant current to the torch or other load. Since the current flowing through resistor 120 is large, a suitable resistor 120 is typically implemented by an appropriately sized metal shunt, such as a shunt resistor or a steel bar. The feedback signal applied to the PWM 30 is negative with respect to system ground, i.e. the voltage at connection J4 is less than that at connection J5 which is connected to system ground.

Returning to FIG. 1, the conditions of the torch and power supply ar monitored by the protection network 130 which acts to start up and to shut down the supply at operating conditions warrant. In one embodiment, the protection network 130 includes event of excessive heating or of lost air pressure in a plasma cutting torch.

Referring again to FIG. 2, the protection network 130 is powered from secondary winding 14 of the transformer 10. The winding 14 drives a diode full bridge rectifier 131 which converts the low-level AC voltage output of the secondary into a DC voltage. This DC output voltage is applied to a suitable voltage regulator U4 which provides a regulated output of five volts which is applied to power the protection circuitry.

Protection circuitry 130 serves to remove power from the PWM circuit 30 in the event of a malfunction. A signal from winding 16 of transformer 10 indicates the presence or absence of an arc in the manner described below. A plurality of other inputs 132 are provided to the protection circuitry representative of malfunctions which should cause shutdown of the power supply such as, for example, overheating of the transistors in power bridges 60, loss of gas pressure at the torch, and similar items. Protection circuitry 130 is of conventional design. The output of protection circuitry 130 is applied to the SHUTDOWN and RESET signal inputs of the PWM 30 via an optical coupler 135. Optical coupler 135 serve to provide electrical isolation between the protection circuitry and the circuitry of PWM 30.

The low-level AC output of secondary winding 16 on transformer 10 is connected, on one side at J6, to the torch clamp and workpiece though a diode CR8 and a current-limiting resistance R19. Due to the polarity of diode CR8, only the positive half-cycles of the AC output are applied to the torch clamp. The other side of the secondary winding 16 is earth-grounded and also connected to the torch tip through jack J7. The voltage across resistor R20 between the torch tip and earth-ground, is limited to a maximum of 3.9 volts by the network of diode CR9 and zener diode CR10, and is applied to the protection circuitry 130 through delay circuit 133.

In one form of operation, the plasma arc is started by touching the torch tip to the workpiece, then withdrawing the tip to a working distance of about an ⅛ inch. When the tip touches the workpiece J6 and J7 (FIG. 2) are shorted, and the voltage at the input to delay circuit 133 is kept high by the voltage from resistor R19 and capacitor C14.

In this mode of operation of a plasma cutting torch, after the torch tip is touched to the workpiece to initiate gas and current flow, the tip is withdrawn to a nominal working distance and the plasma arc is established. Under that condition, the voltage drop across the plasma between the torch tip J7 and clamp at J6 is frequently, but not usually continuously, sufficient to maintain the input to delay circuit 133 at a HIGH level. Delay circuit 133 ensures continuous operation during short periods when the voltage at the torch tip may be insufficient to maintain the input to delay circuit 133 at a high level. Thus the delay network maintains the output from the supply for those brief periods of normal operation when the presence of the plasma is insufficient to keep the output at J7 high. A gas control circuit of conventional design, not shown, may also be automatically operated by applying the signal at J7 to a gas control circuit through another delay circuit 136.

When the torch is to be extinguished, it may be withdrawn from the workpiece to a distance such that the voltage available from the supply for driving the constant current output is insufficient. At that point the arc is extinguished and the signal applied to delay circuit 133 goes low, shutting down the PWM 30. Air or gas is permitted to flow for a selectable time period after extinction of the arc and plasma through the operation of the delay network 136.

If the power supply of the present invention is used with other types of torches, suitable modifications can be readily made in the circuit. For example, if the power supply is used with a torch sold by Hypertherm, Inc. under its trade designation "MAX 20", there is a contact starting without the torch contacting the workpiece. To accommodate this torch, it is necessary to place a control switch of the torch between J6 and J7.

Figure 5:
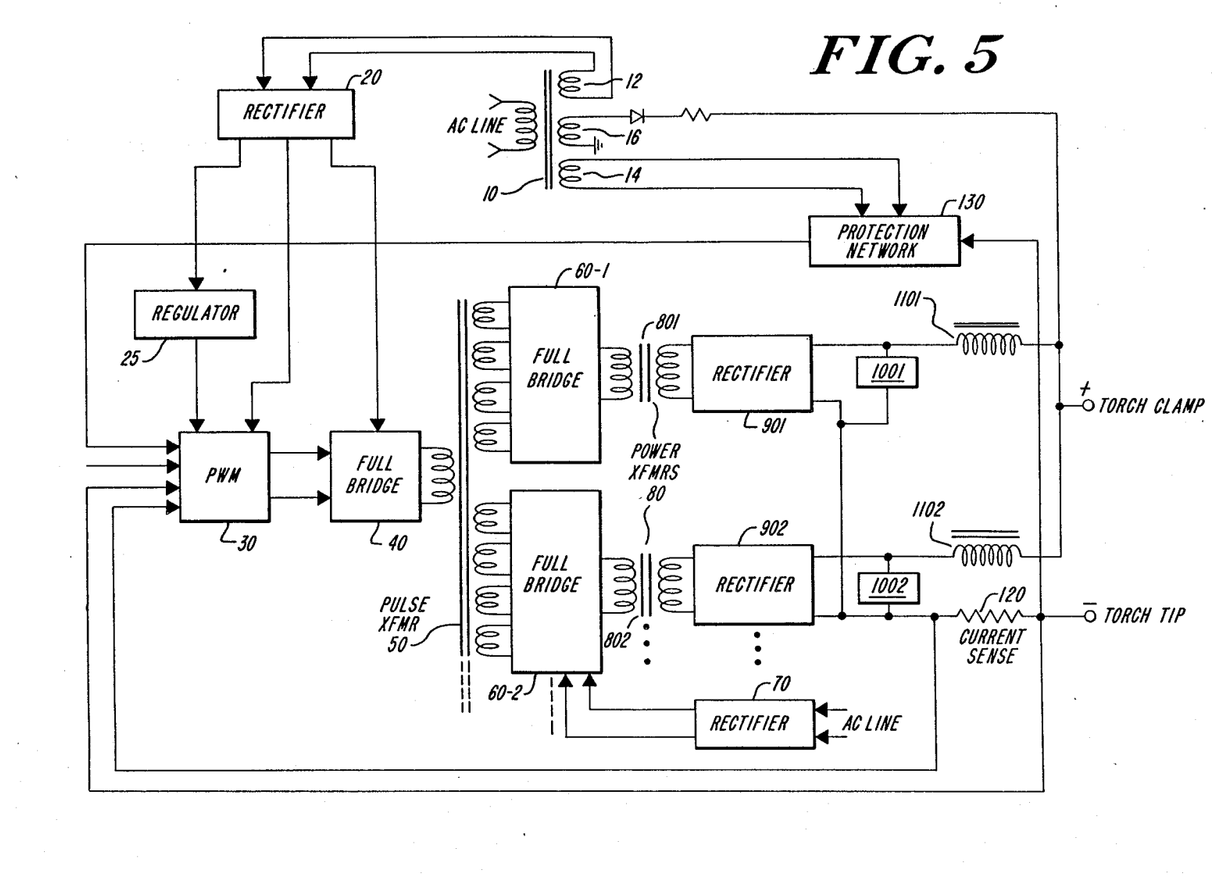
FIG. 5 is a block diagram of another embodiment of a power supply in accordance with the present invention.

Variations in the above-described embodiment will naturally become apparent to those skilled in the art. In another embodiment of the present invention, the supply is configured so that the H-bridges 60 drive primary windings of separate transformer 801, 802, etc. as shown in FIG. 5. The secondaries of the power transformers 801, 802, etc. then each drive dedicated fast-recovery bridge rectifiers 901, 902, etc. and associated snubber networks 1001, 1002, etc. As shown in FIG. 5, there are also a plurality of series output inductors 1101, 1102, etc., and the outputs from these inductors are joined to form a single output from the supply. In this embodiment there remains a single return line and sense resistor 120, however, thereby allowing the remainder of the power supply to be as already stated.

It will be understood that the present invention has applicability to a wide variety of areas, such as induction heating equipment electro plating equipment, Krypton HID lasers, and others, where there exist requirements for regulated-output power supplies. The circuit details of the above-described embodiment, would naturally be modified to accommodate the appropriate particular requirements of the application. Accordingly, it should be appreciated that the invention is described by way of example with reference to the figures and that the invention may be incorporated in other embodiments. Accordingly, the scope of the invention should not be limited by the description above of particular embodiments, but rather should only be interpreted in accordance with the following claims.

What is claimed is:

1. A switching power supply for providing a regulated DC power output, comprising:
    means for producing an input signal representative of a desired DC power output to be supplied by said switching power supply,
    a pulse-width modulator (PWM) circuit responsive to said input signal which produces a pulse-width modulated (PWM) output signal with its pulse width varying as a function of the said input signal;
    a plurality of switching means operating in parallel and each having at least one signal input and at least one AC power output;
    power transformer means having a core, at least one primary winding, and at least one secondary winding, each primary winding being connected to said AC power output of an associated one of said switching means, said PWM circuit and said switching means producing an AC signal across said power transformer means primary windings, said power transformer being characterized by a finite mutual inductance between said primaries to accommodate variations in the operation of said plurality of switching means; and
    means for magnetically coupling said PWM circuit to said plurality of switching means to operate said switching means in response to said PWM output signal, said magnetic coupling means including means for controlling circulating electrical energy in said magnetic coupling means and said switching means to reduce timing uncertainty in the switching of said plurality of switching means to a level that assures a substantially synchronous operation of plurality of said switching means.

2. The switching power supply of claim 1 wherein said means for magnetically coupling comprises a pulse transformer.

3. The switching power supply of claim 2 wherein said pulse transformer has a core with a large cross sectional area, a primary winding, and a plurality of secondary windings each electrically connected to an associated one of said switching means.

4. The switching power supply of claim 3 wherein said circulating electrical energy controlling means includes forming said primary and secondary windings of coaxial cable wound around said core.

5. The switching power supply of claim 4 wherein said core is formed of a magnetic material with good high frequency response and a wide bandwidth.

6. The switching power supply of claim 5 wherein said magnetic material is a ferrite.

7. The switching power supply of claim 6 wherein said core geometry is toroidal.

8. The switching power supply of claim 7 wherein said core has a U shape.

9. The switching power supply of claim 4 wherein the coaxial cables forming the primary and secondary windings include a plurality of coaxial cable segments wound around the core each having the same number of turns, the coaxial cable segments each including an inner conductor and an outer conductor, the first and second ends of one of the inner or outer conductors of each of the segments being connected to form the primary winding, the other of the inner or outer conductors forming said plurality of secondary windings.

10. The switching power supply of claims 1 or 4 wherein each of the switching means includes an H bridge circuit.

11. The switching power supply of claim 10 wherein each of said H bridge circuits comprises four field effect transistors.

12. The switching power supply of claim 11 wherein said field effect transistors are n channel.
13. The switching power supply of claim 11 wherein said field effect transistors are p-channel.
14. The switching power supply of claim 11 wherein said magnetic coupling means drives the gates of said field effect transistors.

* * * * *